(12) United States Patent
Nishida et al.

(10) Patent No.: US 11,267,489 B2
(45) Date of Patent: Mar. 8, 2022

(54) AUTOMATIC OPERATION ASSISTANCE SYSTEM AND AUTOMATIC OPERATION ASSISTANCE METHOD

(71) Applicant: HITACHI, LTD., Tokyo (JP)

(72) Inventors: Takehisa Nishida, Tokyo (JP); Mariko Okude, Tokyo (JP)

(73) Assignee: HITACHI, LTD., Tokyo (JP)

( * ) Notice: Subject to any disclaimer, the term of this patent is extended or adjusted under 35 U.S.C. 154(b) by 745 days.

(21) Appl. No.: 16/081,415

(22) PCT Filed: Feb. 14, 2017

(86) PCT No.: PCT/JP2017/005253
§ 371 (c)(1),
(2) Date: Aug. 30, 2018

(87) PCT Pub. No.: WO2017/159176
PCT Pub. Date: Sep. 21, 2017

(65) Prior Publication Data
US 2021/0179146 A1    Jun. 17, 2021

(30) Foreign Application Priority Data
Mar. 17, 2016 (JP) .............................. JP2016-053211

(51) Int. Cl.
*B60W 60/00* (2020.01)
*B60W 50/14* (2020.01)
(Continued)

(52) U.S. Cl.
CPC ........ *B60W 60/0059* (2020.02); *B60W 50/14* (2013.01); *B60W 60/0055* (2020.02);
(Continued)

(58) Field of Classification Search
None
See application file for complete search history.

(56) References Cited

U.S. PATENT DOCUMENTS 5,325,082 A * 6/1994 Rodriguez .......... B60R 16/0315
340/438
9,612,123 B1 * 4/2017 Levinson ............. B60W 30/09
(Continued)

FOREIGN PATENT DOCUMENTS

| | | |
|---|---|---|
| JP | 2011-196786 A | 10/2011 |
| JP | 2015-162175 A | 9/2015 |

(Continued)

OTHER PUBLICATIONS

International Search Report with English translation and Written Opinion issued in corresponding application No. PCT/JP2017/005253 dated May 16, 2017.

*Primary Examiner* — Dale W Hilgendorf
*Assistant Examiner* — Alexander C. Bost
(74) *Attorney, Agent, or Firm* — Foley & Lardner LLP

(57) ABSTRACT

Provided is an automatic operation assistance system comprising: a telematics center (1) that gives notification to a connected car (2) in accordance with a request that originated from the connected car (2), the notification pertaining to the traveling environment of the connected car (2) from which the request originated and a sensor evaluation value matching an external field sensor (22*a*); and the connected car (2) that changes, on the basis of the sensor evaluation value notified from the telematics center (1), a process for reflecting recognition data of each external field sensor (22*a*) of the connected car on an automatic operation control of the connected car.

6 Claims, 8 Drawing Sheets

(51) Int. Cl.
*G01C 21/34* (2006.01)
*G01C 21/36* (2006.01)

(52) U.S. Cl.
CPC ..... *G01C 21/3446* (2013.01); *G01C 21/3605* (2013.01); *B60W 2050/143* (2013.01)

(56) References Cited

U.S. PATENT DOCUMENTS

| | | | |
|---|---|---|---|
| 9,688,288 B1* | 6/2017 | Lathrop | G05D 1/0061 |
| 9,925,987 B1* | 3/2018 | Nguyen | B60W 50/14 |
| 2013/0197736 A1* | 8/2013 | Zhu | G05D 1/0088 |
| | | | 701/26 |
| 2015/0321665 A1* | 11/2015 | Pandita | B60W 30/0956 |
| | | | 701/409 |
| 2017/0139418 A1* | 5/2017 | Hiramatsu | B60T 7/22 |
| 2017/0174227 A1* | 6/2017 | Tatourian | G06K 9/3241 |
| 2018/0001890 A1* | 1/2018 | Ratcliffe | B60W 30/095 |

FOREIGN PATENT DOCUMENTS

| | | |
|---|---|---|
| JP | 2015-175825 A | 10/2015 |
| JP | 2016-028927 A | 3/2016 |

\* cited by examiner

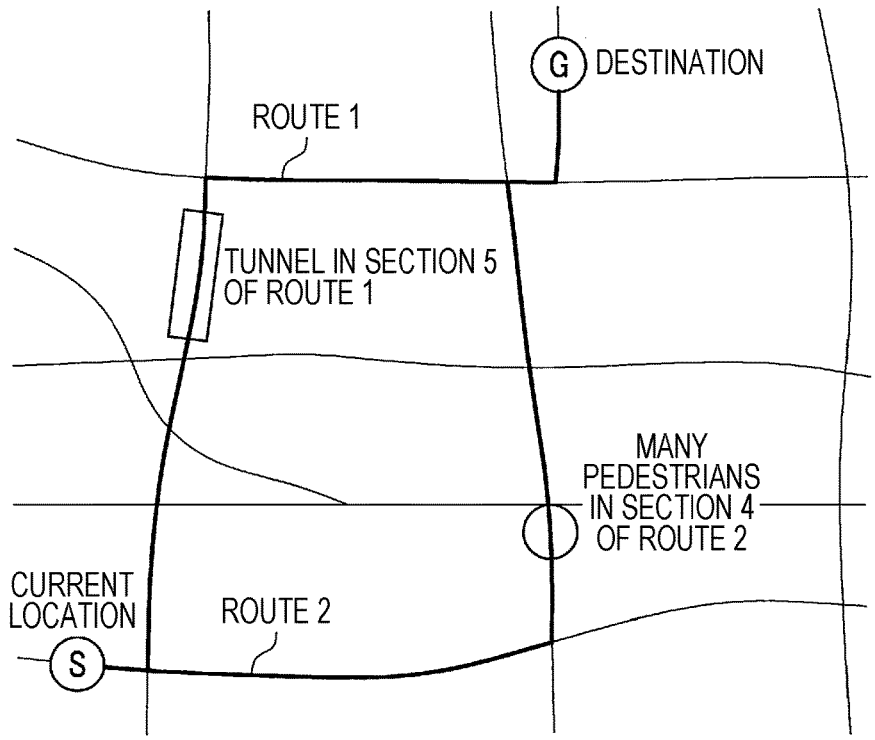

FIG. 4A

| | | |
|---|---|---|
| NUMBER OF DEVICES | 2 | ⎫ |
| NUMBER OF ROUTES | 2 | ⎬ HEADER |
| ROUTE ID | 1 | ⎬ |
| NUMBER OF SECTIONS | 9 | ⎭ |
| SECTION ID | 1 | ⎫ |
| SECTION START POINT | 32 | ⎬ |
| SECTION END POINT | 33 | ⎬ SECTION ID = 1 |
| EVALUATION VALUE OF SENSOR A | 10 | ⎬ |
| EVALUATION VALUE OF SENSOR B | 10 | ⎭ |
| SECTION ID | 2 | ⎫ |
| SECTION START POINT | 33 | ⎬ SECTION ID = 2 |
| ⋮ | ⋮ | |

FIG. 4B

| | | |
|---|---|---|
| NUMBER OF ROUTES | 2 | — HEADER |
| ROUTE ID | 1 | |
| NUMBER OF SECTIONS | 9 | ⎫ |
| SECTION ID | 1 | ⎬ |
| SECTION EVALUATION VALUE | 10 | ⎬ EACH SECTION EVALUATION VALUE OF ROUTE 1 |
| SECTION ID | 2 | ⎬ |
| SECTION EVALUATION VALUE | 10 | ⎬ |
| ⋮ | ⋮ | ⎭ |
| OVERALL EVALUATION VALUE | 9.6 | — OVERALL EVALUATION VALUE OF ROUTE 1 |
| ROUTE ID | 2 | |
| NUMBER OF SECTIONS | 8 | ⎫ EACH SECTION EVALUATION VALUE OF ROUTE 2 |
| SECTION ID | 1 | ⎬ |
| ⋮ | ⋮ | ⎭ |

AUTOMATIC OPERATION ASSISTANCE SYSTEM AND AUTOMATIC OPERATION ASSISTANCE METHOD

INCORPORATION BY REFERENCE

This application claims priority from Japanese Patent Application No. 2016-53211 filed on Mar. 17, 2016, the content thereof is incorporated herein by reference.

TECHNICAL FIELD

The present invention relates to an automatic operation assistance system and an automatic operation assistance method.

BACKGROUND ART

Navigation apparatuses for showing routes to destinations to car drivers have spread. When searching for a route, a navigation apparatus presents a plurality of route candidates satisfying various desired conditions designated by a driver such as "as short as possible" and "to avoid using toll roads as much as possible".

PTL 1 discloses that a recommended route is to be "a route with the smallest number of times or the shortest time for the automatic operation of a vehicle to be interrupted". For this reason, by increasing the rate of automatic operation, the driver's burden of driving can be reduced.

CITATION LIST

Patent Literature

PTL 1: JP 2015-175825 A

SUMMARY OF INVENTION

Technical Problem

Increasing the rate of automatic operation decreases the burden on a driver, but can cause a case in which the operation is not smoothly performed in a road environment where the sensor value of an external field sensor, which is the input of automatic operation, is not accurate. On the other hand, increasing the rate of manual operation improves the stability of the vehicle operation by the driver's judgements, but increases the driver's burden of driving. Thus, it is necessary to properly balance automatic operation and manual operation.

The navigation apparatus disclosed in PTL 1 can set a route that avoids interruption sections, in which automatic operation is not recommended, as much as possible. However, there are many places in which a plurality of selectable routes (bypass roads) is not originally constructed such as local mountain roads. Thus, it is desirable to reduce the burden on the driver by adopting automatic operation as much as possible in a traveling environment where automatic operation can be adopted by methods other than selecting a route.

Furthermore, instead of rough control as to whether automatic operation is adopted, fine control as to how to combine external field sensors, which are the input when automatic operation is adopted, in order to more stably perform automatic operation control is required.

Thus, a purpose of the present invention is mainly to appropriately perform automatic operation control in consideration of the characteristics of external field sensors.

Solution to Problem

In order to solve the above problem, an automatic operation assistance system of the present invention includes a center device that manages a database that associates each traffic environment in a moving route of a moving body with sensor evaluation values each indicating recognition accuracy of a respective one of external field sensors that recognize the corresponding traffic environment, and that gives notification to the moving body in accordance with a request that originated from the moving body, the notification pertaining to the traffic environment of the moving body from which the request originated and the sensor evaluation values matching the external field sensors, and the moving body that changes, on the basis of the sensor evaluation values notified from the center device, a process for reflecting recognition data of the external field sensors of the moving body in automatic operation control of the moving body.

Other means will be described later.

Advantageous Effects of Invention

According to the present invention, it is possible to appropriately perform automatic operation control in consideration of the characteristics of external field sensors.

BRIEF DESCRIPTION OF DRAWINGS

FIG. 3(*a*) is a plan view showing an example of a route generated by a route-candidate generation unit. FIG. 3(*b*) is a table showing evaluation values in the route in FIG. 3(*a*).

FIG. 4(*a*) is transmission data of sensor evaluation values provided by the external-field-sensor evaluation unit. FIG. 4(*b*) is transmission data of section evaluation values and route evaluation values provided by a route evaluation unit.

FIG. 8(*b*) is a three-dimensional view when the 3D route in FIG. 8(*a*) is viewed from a bird's-eye viewpoint.

DESCRIPTION OF EMBODIMENT

Hereinafter, an embodiment of the present invention is described in detail with reference to the drawings.

Figure 1:
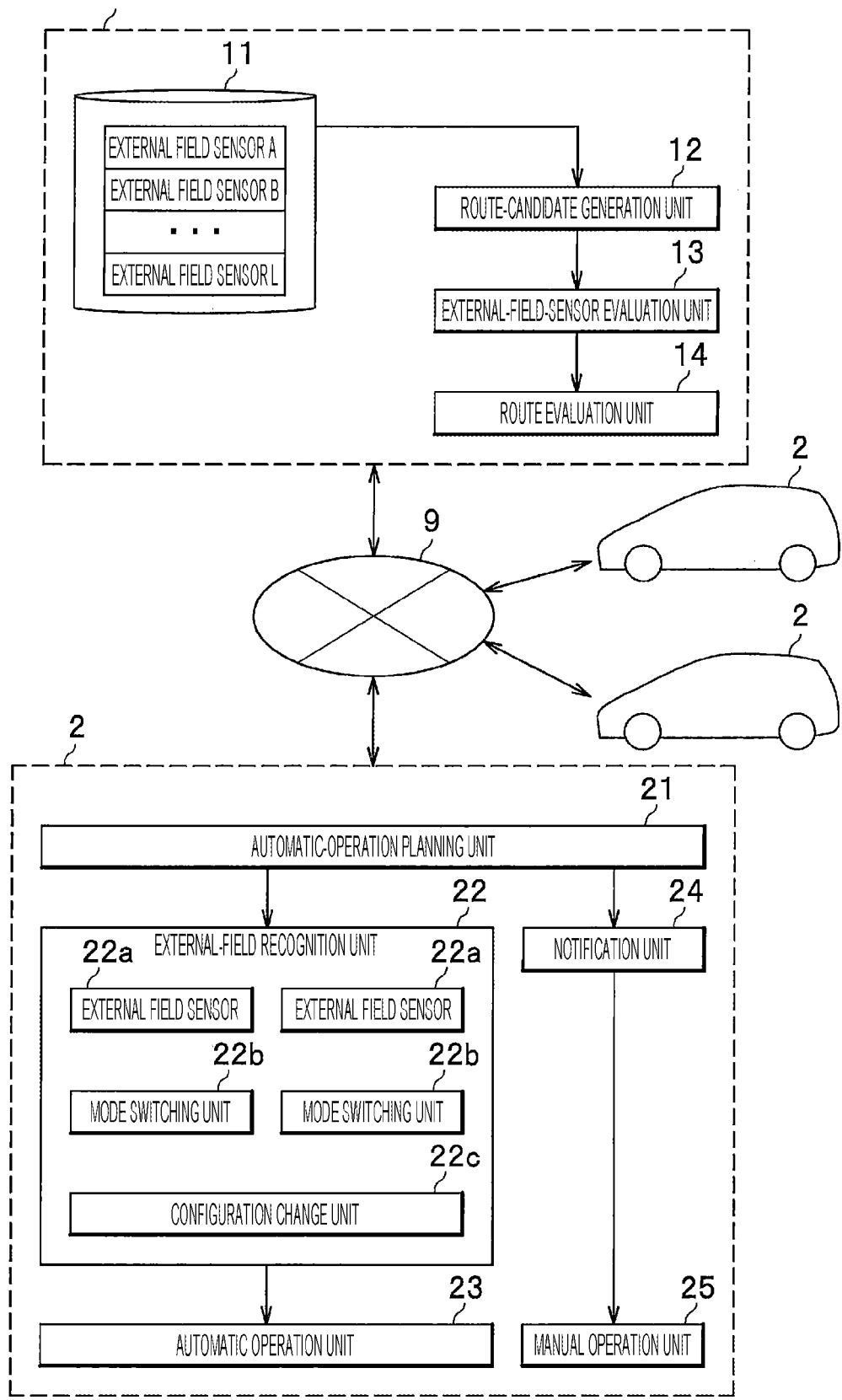
FIG. 1 is a configuration diagram when an automatic operation assistance system according to an embodiment of the present invention is applied to a connected car.

FIG. 1 is a configuration diagram when an automatic operation assistance system is applied to a connected car 2.

Note that, a moving body that can perform automatic operation, which is a target of the automatic operation assistance system, is only required to be communicably connected with a telematics center 1, and is not limited to the connected car 2. In addition, the number of connected cars 2 connected via a network 9 is not limited to three as exemplified in FIG. 1. FIG. 1 shows the details of the internal configuration of one of the connected cars 2, but the other two connected cars 2 have the same configuration.

Each device in the automatic operation assistance system is configured as a computer having a central processing unit (CPU), a memory, a storage means (storage unit) such as a hard disk, and a network interface.

In the computer, the CPU executes a program (also referred to as an application or app as its abbreviation) loaded into the memory, and which operates a control unit (control means) constituted by processing units.

The telematics center 1 includes an external-field recognition DB 11, a route-candidate generation unit 12, an external-field-sensor evaluation unit 13, and a route evaluation unit 14.

The external-field recognition DB 11 is a database storing recognition results of external field sensors 22a installed in the surroundings (hereinafter referred to as an "external field") of the connected car 2.

In the recognition results, "success" means, for example, that an external field sensor 22a can recognize an obstacle (such as a rock) that actually exists ahead of the connected car 2 as "there is an obstacle", or that the external field sensor 22a recognize a situation that nothing exists ahead of the connected car 2 as "there is no obstacle".

In the recognition results, "failure" is opposite to the above "success" and means, for example, that the external field sensor 22a recognizes a situation as "there is no obstacle" although an obstacle (such as a rock) actually exists ahead of the connected car 2.

In other words, "failure" in the recognition results indicates recognition accuracy=0%, and "success" indicates recognition accuracy=100%. On the other hand, not only two kinds of recognition accuracy such as failure or success but also fine values such as recognition accuracy=60% may be set.

The external-field recognition DB 11 associates, for each predetermined environment (past time, place, and the like), the information indicating the environment with the recognition result of each external field sensor 22a under the environment. The external-field recognition DB 11 stores, for example, the following correspondence information.

Correspondence information: environment "location=exit of tunnel A, date/time=11:00 a.m. on October 10, weather=rain"→external field sensor 22a "obstacle is extracted from images captured by camera"→recognition result "success, a vehicle traveling ahead is correctly recognized".

Correspondence information: environment "location=exit of tunnel A, date/time=11:00 a.m. on October 10, weather=sunny"→external field sensor 22a "obstacle is extracted from images captured by camera"→recognition result "failure, a vehicle traveling ahead is not recognized due to backlight".

The processing for determining the recognition result as "success/failure" may be performed automatically by a calculator or manually by a person, or by using both determinations in combination. For example, if the output of the external field sensor 22a is "there is no obstacle ahead-"→the output of a manual operation unit 25 of the connected car 2 is "sudden braking", the calculator may automatically determine the recognition result as "failure" due to mismatch between the two outputs. Furthermore, a person may visually check the determination result of the computer, and finally determine the recognition result as "success/failure".

When receiving a route generation request from the connected car 2, the route-candidate generation unit 12 generates route candidates from the current location to the destination. Here, the route candidates are searched for in consideration of the shortest traveling distance route, the shortest traveling time route, whether automatic operation is permitted, whether the road is recommended for automatic operation, and the like. Also, the routes at this point may include not only road-level routes by nodes and links, but also lane-level routes.

The external-field-sensor evaluation unit 13 calculates an evaluation value (sensor evaluation value) of each external field sensor 22a for each route candidate generated by the route-candidate generation unit 12, and outputs the sensor evaluation values to the connected car 2 from which the route generation request is originated.

The route evaluation unit 14 calculates the evaluation as to whether automatic operation is permitted for each route candidate generated by the route-candidate generation unit 12 (a section evaluation value for each section which is a part of the route, a route evaluation value integrating the evaluation of all the sections of the route), and transmits the calculation result to the connected car 2 from which the route generation request is originated.

The connected car 2 includes an automatic-operation planning unit 21, an external-field recognition unit 22, an automatic operation unit 23, a notification unit 24, and a manual operation unit 25. The external-field recognition unit 22 includes one or more external field sensors 22a, a mode switching unit 22b for each external field sensor 22a, and a configuration change unit 22c.

The automatic-operation planning unit 21 transmits a route generation request to the telematics center 1. The route generation request includes at least the vehicle ID, the current location, the destination, and information on the mounted external field sensors 22a. In addition, the automatic-operation planning unit 21 plans automatic operation (switching automatic operation/manual operation for each section of the route) based on the evaluation values (the sensor evaluation values, the section evaluation values, the route evaluation values) included in the reply to the route generation request.

The external field sensors 22a are sensors such as a camera, a millimeter-wave radar, and an infrared laser, and at least one external field sensor 22a is mounted in the external-field recognition unit 22. Preferably, a plurality of external field sensors 22a is mounted so as to be able to recognize the surroundings (front, back, sides, and the like) of the connected car 2, and a plurality of types of external field sensors 22a is mounted so as to be able to compensate the strengths and weaknesses of each sensor.

The mode switching unit 22b switches, based on the sensor evaluation values, modes of each external field sensor 22a corresponding to itself. Here, the modes mean a recognition mode, a sampling rate, and a recognition parameter of each sensor. For example, when the sensor evaluation value of an in-vehicle camera is low under a certain environment, by increasing the sampling rate to improve the quality of the image captured by the in-vehicle camera, the reliability of the output of the external field sensor 22a is increased (complemented) regardless of the low sensor evaluation value.

The configuration change unit 22c changes the contribution degree of each external field sensor 22a to the automatic operation unit 23 based on the sensor evaluation value of each external field sensor 22a. For example, the configuration change unit 22c changes the configuration of the external field sensor 22a by not using the recognition result of the external field sensor 22a having a low sensor evaluation value for automatic operation, or by reducing the importance degree as an input parameter of automatic operation.

The automatic operation unit 23 performs automatic operation based on the recognition result recognized by the external-field recognition unit 22 and the automatic operation planned by the automatic-operation planning unit 21.

The notification unit 24 notifies the user of the section set as the manual operation section by the automatic-operation planning unit 21. The trigger for this notification is, for example, at the time of planning the automatic operation and before entering the manual operation section.

The manual operation unit 25 passes the control of the connected car 2 to the user in the section set as the manual operation section by the automatic-operation planning unit 21 to enable the user to control the operation.

Note that, the data in the same external-field recognition DB 11 may be shared by a plurality of connected cars 2. For example, when receiving a route generation request from a connected car 2, the telematics center 1 may read the history of the external field recognition of another connected car 2 from the external-field recognition DB 11, and determine, based on the history, whether the requesting connected car 2 is possible to perform automatic operation.

Figure 2:
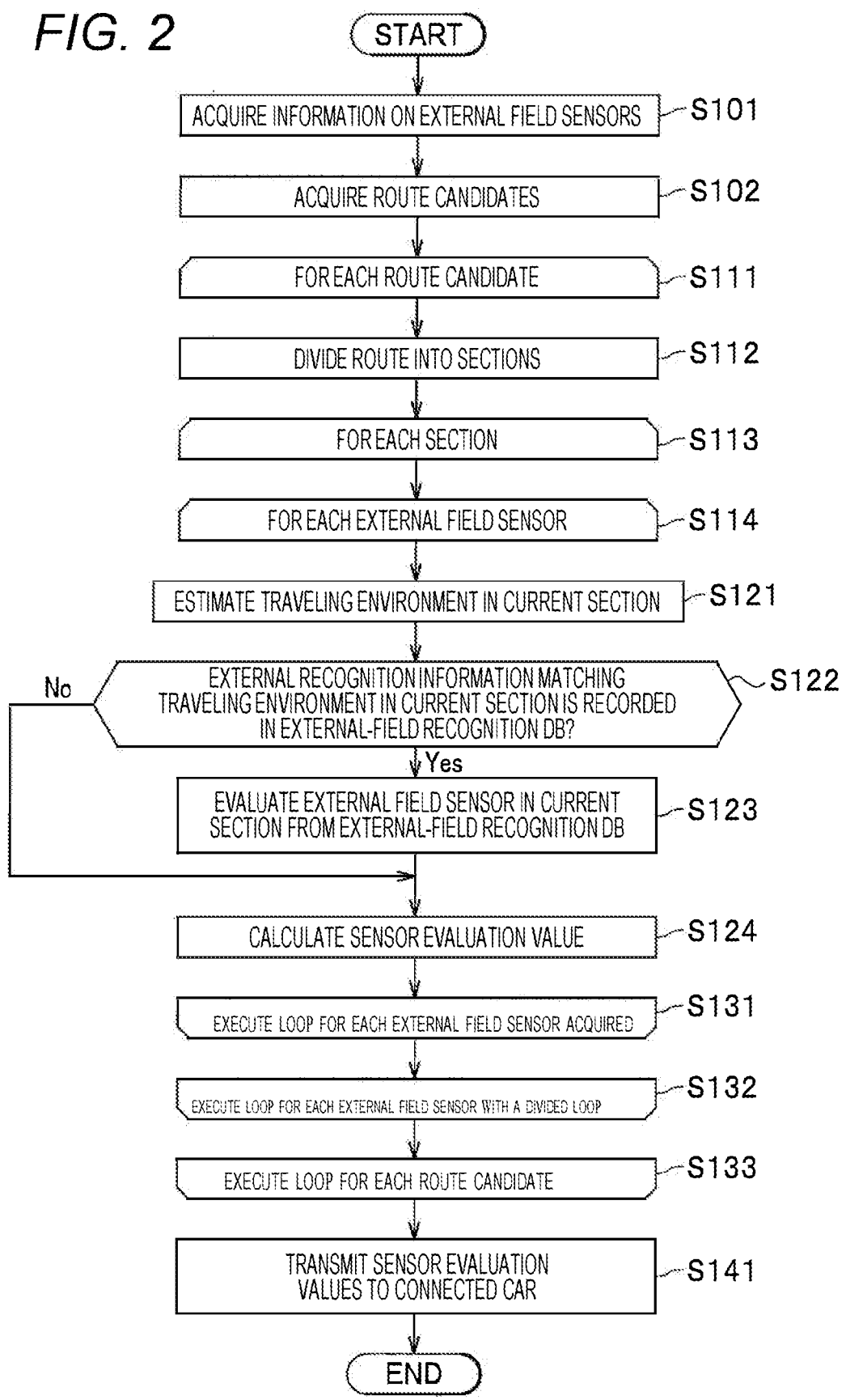
FIG. 2 is a flowchart showing processing of an external-field-sensor evaluation unit according to an embodiment of the present invention.

FIG. 2 is a flowchart showing processing of the external-field-sensor evaluation unit 13.

The external-field-sensor evaluation unit 13 acquires, from the route generation request, the information on the external field sensors 22a mounted on the connected car 2 that has requested the route generation (S101).

The external-field-sensor evaluation unit 13 acquires the route candidates generated by the route-candidate generation unit 12 that satisfies the current location and the destination designated by the route generation request (S102). Then, the external-field-sensor evaluation unit 13 executes a loop for each route candidate in S102 (S111 to S133).

The external-field-sensor evaluation unit 13 divides a route candidate selected in the current loop into sections (S112). The sections here can be sections into which the route candidate is divided based on the characteristics of the external field sensors 22a mounted on the connected car 2 which has requested the route generation. For example, when a camera is mounted as the external field sensor 22a, backlight is generated near a tunnel exit, and non-detection or false detection can occur. For this reason, a method for dividing the route candidate so as to make one section near the tunnel is used. In addition, the route candidate may be divided into sections depending on whether a complicated traveling technique for automatic operation, such as turning left/right or changing lanes, is required as compared with straight traveling.

Then, the external-field-sensor evaluation unit 13 executes a loop for each section into which the route candidate is divided in S112 (S113 to S132). In the loop, the external-field-sensor evaluation unit 13 further executes a loop for each external field sensor 22a acquired in S101 (S114 to S131).

The external-field-sensor evaluation unit 13 estimates the traveling environment (features of the place such as a traveling place and a tunnel exit, weather, time, and the like) of the connected car 2 that has transmitted the route generation request this time (S121), and determines whether external recognition information matching the estimated traveling environment (traffic environment) is recorded in the external-field recognition DB 11 (S122). When the external recognition information is recorded (S122, Yes), the external-field-sensor evaluation unit 13 evaluates, by, for example, reading the recognition result "success/failure" from the external-field recognition DB 11, the external field sensor 22a in the matching traveling environment (the corresponding section) from the external-field recognition DB 11 (S123). Then, the external-field-sensor evaluation unit 13 calculates the sensor evaluation value of the evaluates the external field sensor 22a selected in the loop in S114 by setting the evaluation value to be high (good) as the recognition result is success (S124).

On the other hand, when the external recognition information is not recorded in S122 (No), the external-field-sensor evaluation unit 13 directly calculates the evaluation value in S124. The calculation of the evaluation in S124 is performed by, for example, setting a reference value to 10 points or the like, and subtracting one point from the reference value in the case of recognition failure or adding one point to the reference value in the case of recognition success when the matching external recognition information is recorded in the external-field recognition DB 11 in S122. The evaluation of the external field sensor 22a in S123 is performed in consideration of, as the subtracting factors, the number of false detections and the number of non-detections in the same environment, the number of occurrences of false detection/non-detection, the probability of occurrence, the time stamp and trend of the last occurrence, and the like.

In S141, the external-field-sensor evaluation unit 13 transmits all calculated route candidates and the evaluation results (sensor evaluation value) for each external field sensor 22a in all sections to the connected car 2 that has requested the route generation. That is, the telematics center 1 transmits sensor evaluation values matching the traveling environment around the connected car from which the request is originated and the external field sensors 22a mounted on the connected car 2 to the connected car 2 from which the request is originated to instruct the connected car 2 to change the automatic operation control.

FIG. 3(a) is a plan view showing an example of a route generated by the route-candidate generation unit 12.

It is assumed that the route-candidate generation unit 12 generates two routes in total of a route "1" passing through a tunnel and a route "1" not passing through a tunnel. It is further assumed, when the route from the current location to the destination is divided into sections at links (roads between intersections), that the tunnel exists in the section "5" of the route "1", and that there is a road with many pedestrians in the section "4" of the route "2" and the external-field recognition DB 11 stores a past failure of the external field sensor 22a in the section "4".

FIG. 3(b) is a table showing evaluation values in the route in FIG. 3(a).

The left-side table in FIG. 3(b) shows a sensor evaluation value for each external field sensor 22a calculated by the external-field-sensor evaluation unit 13 in the processing in FIG. 2. Here, in FIG. 3(a), when it is assumed that the current environment is sunny and daytime, backlight can be generated at the exit of the tunnel, and many pedestrians can be probably in the section "4" of the route "2". Thus, the sensor evaluation value of the external field sensor "A", which has a weakness in backlight, in the section "5" of the route "1" (near the tunnel) is lowered to "3". Similarly, the sensor evaluation value of the external field sensor "B", which has a weakness in pedestrian recognition, in the section "4" of the route "2" is lowered to "6".

In the right-side table in FIG. 3(b), the route evaluation unit 14 calculates a section evaluation value of each section of each route based on the sensor evaluation value in each section. For example, when a plurality of sensor evaluation values exists in the same section of the same route, the route evaluation unit 14 sets the maximum value of the sensor evaluation values as the section evaluation value. As a result, the section evaluation value "8" of the section "5" of the route "1" is obtained from the sensor evaluation values "A=3, B=8" in the section "5" of the route "1".

However, if the external field sensor 22a having a high evaluation value is unsuitable for performing automatic operation (for example, the detection distance is short) or the like, the route evaluation unit 14 may calculate a section evaluation value for determining whether automatic operation is possible using statistical values such as an average value and a median value.

The route evaluation unit 14 further sets the average value of the section evaluation values for each route as a route evaluation value (overall evaluation value) of each route. The route evaluation value is only required to be calculated in consideration of a statistical value such as an average value, a distance and a length of time of a section in which automatic operation can be performed, a complexity of driving in a section requiring manual operation, and the like.

The route evaluation unit 14 transmits these calculation results (the section evaluation values and the route evaluation values) to the connected car 2, and the connected car 2 thereby obtains the evaluation of its each external field sensor 22a on the provided route. For this reason, it is possible to change the configurations and modes of the external field sensors 22a in the external-field recognition unit 22 in preparation for failure of the external-field recognition during automatic operation.

FIG. 4(a) is transmission data of sensor evaluation values provided by the external-field-sensor evaluation unit 13. As shown in FIG. 4(a), the number of devices of the external field sensors 22a mounted on the connected car 2, the number of routes generated by the route-candidate generation unit 12, the route ID of the number of routes, and the number of sections included in the route are stored in the header of a packet, and, after the header, data for section ID=1, data for section ID=2, are stored in that order in the data section.

The section start point and the section end point of each section ID may be the numbers assigned to nodes (intersections), the positions specified by latitude, longitude, or altitude, or the detailed vehicle positions at the lane level.

FIG. 4(b) is transmission data of section evaluation values and route evaluation values provided by the route evaluation unit 14. After the header of a packet similar to FIG. 4(a), each section evaluation value and the route evaluation value of the route "1", and each section evaluation value and the route evaluation value of the route "2" are sequentially stored in the data section of the packet. By referring to the data, the connected car 2 can determine whether to permit automatic operation in the current traveling environment of the connected car 2.

Figure 5:
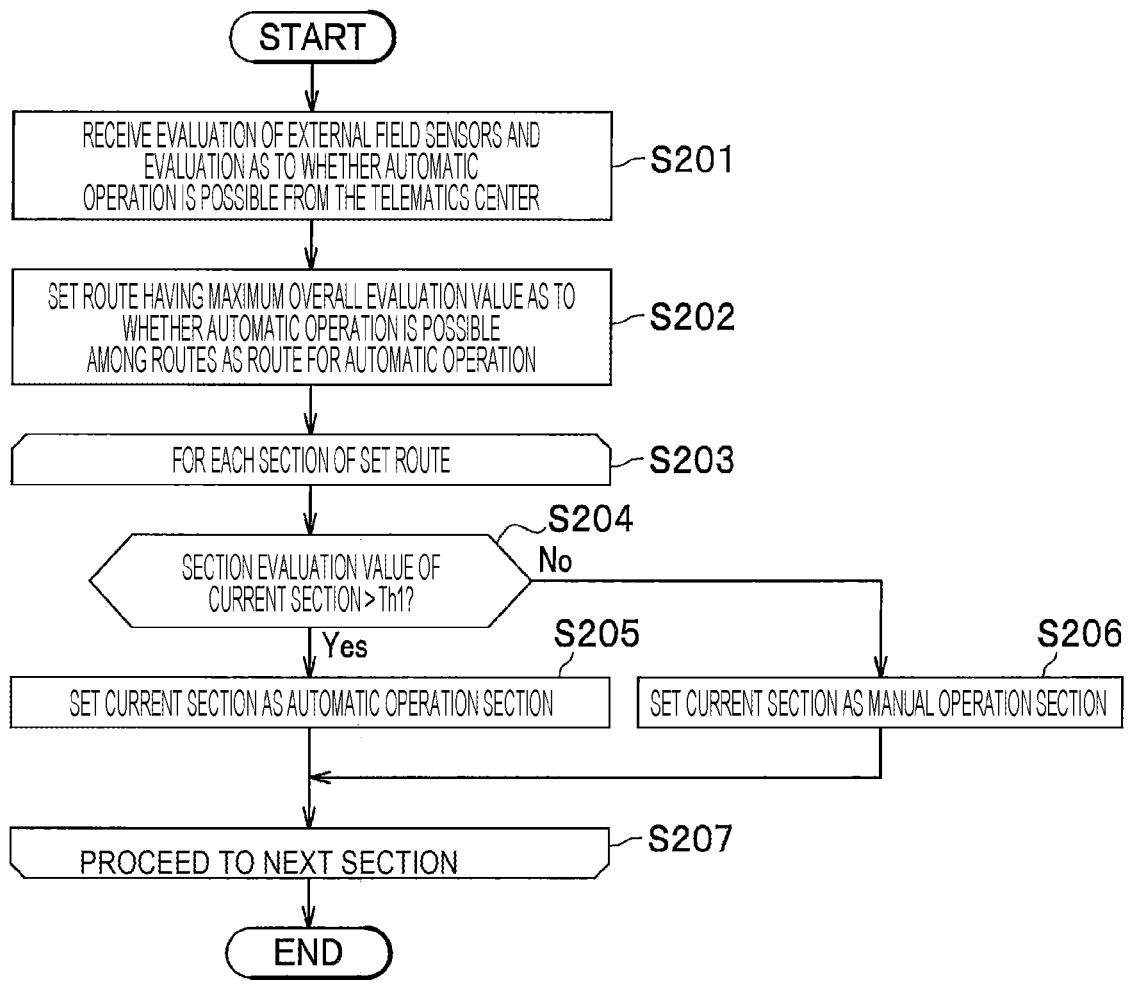
FIG. 5 is a flowchart showing processing when a connected car according to an embodiment of the present invention receives each transmission data in FIG. 4.

FIG. 5 is a flowchart showing processing when the connected car 2 receives each transmission data in FIG. 4.

In S201, the connected car 2 receives each data in FIG. 4 (the evaluation of the external field sensors and the evaluation as to whether automatic operation is possible) from the telematics center 1.

In S202, the automatic-operation planning unit 21 sets the route in which the route evaluation value (overall evaluation value) in S201 is the maximum as the route for automatic operation for itself to be travelling on.

Here, in S203 to S207, the automatic-operation planning unit 21 performs processing for each section of the route for automatic operation set in S202.

In S204, the automatic-operation planning unit 21 determines whether the section evaluation value selected in the current loop is larger than the threshold value Th1.

When the section evaluation value>the threshold value Th1, the automatic-operation planning unit 21 sets the section as an automatic operation section and operates the automatic operation unit 23 (S205).

When the section evaluation value the threshold value Th1, the automatic-operation planning unit 21 sets the section as the manual operation section and operates the manual operation unit 25 (S206).

Thus, the section in which the possibility of failure of external field recognition is low is set as an automatic operation section, and the section in which the possibility of failure of external field recognition is high is set as a manual operation section. For this reason, it is possible to increase the reliability of automatic operation.

Figure 6:
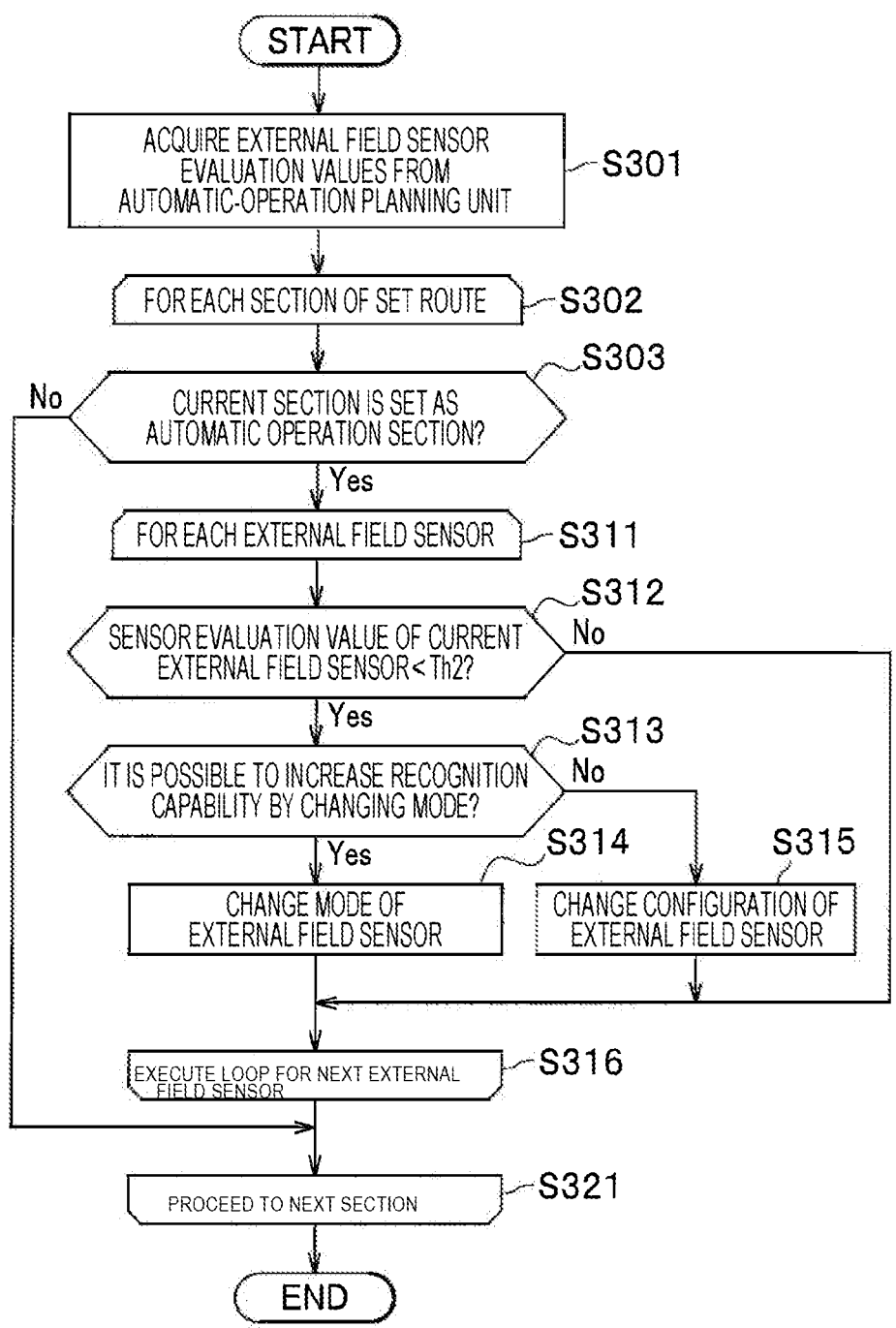
FIG. 6 is a flowchart showing processing of an external-field recognition unit according to an embodiment of the present invention.

FIG. 6 is a flowchart showing processing of the external-field recognition unit 22.

In S301, the external-field recognition unit 22 acquires, from the automatic-operation planning unit 21, the sensor evaluation values received from the telematics center 1.

S302 to S321 are a loop to be executed for each section of the route set in S202.

In S303, the external-field recognition unit 22 determines whether the current section is set as the automatic operation section. When the current section is set as the automatic operation section (S303, Yes), the processing proceeds to S311. When the current section is not set as the automatic operation section (S303, No), the processing for the current section is terminated, and the processing proceeds to S321 for the next section.

S311 to S316 are a loop executed for each external field sensor 22a mounted on the connected car 2.

In S312, the external-field recognition unit 22 determines whether the sensor evaluation value of the current external field sensor 22a is smaller than the threshold value Th2. When the answer is Yes in S312, the processing proceeds to S313. When the answer is No, the processing proceeds to S316 to execute the loop for the next external field sensor 22a.

In S313, the external-field recognition unit 22 determines whether it is possible to increase the recognition capability by changing the mode of the current external field sensor 22a. Here, the mode indicates a recognition mode specific to each external field sensor 22a, a recognition parameter, a sampling rate, a gain, or the like. When the answer is Yes in S313, the processing proceeds to S314. When the answer is No, the processing proceeds to S315.

In S314, the external-field recognition unit 22 performs setting so as to change the mode of the current external field sensor 22a to the mode, by which the recognition capability is increased in the corresponding section, determined in S313.

In S315, the external-field recognition unit 22 performs setting so as to change the configuration of the current external field sensor 22a in the corresponding section. Here, the change in configuration means that the recognition result of the recognition device in which the evaluation value of the external field sensor 22a is lower than Th2 is not used, or that the importance degree is lowered.

Thus, if there is a section in which the external field recognition capability of a specific external field sensor 22a is low, by changing the mode or configuration, the external recognition capability as a whole is increased. For this reason, it is possible to increase the reliability of the automatic operation performed by the automatic operation unit 23.

Figure 7:
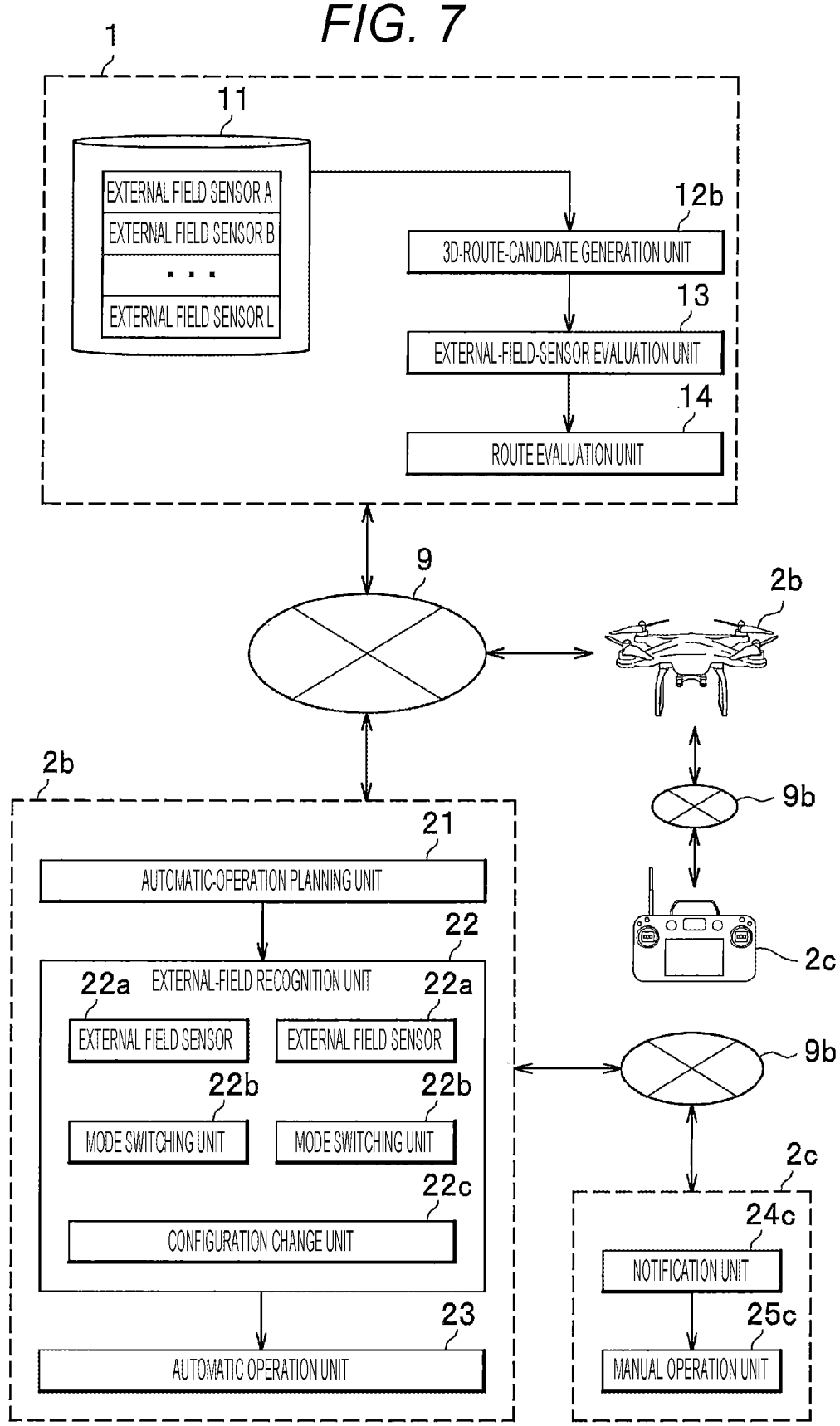
FIG. 7 is a configuration diagram when an automatic operation assistance system according to an embodiment of the present invention is applied to an autonomous flying body.

FIG. 7 is a configuration diagram when the automatic operation assistance system is applied to an autonomous flying body 2b. In this configuration diagram, the connected car 2 in FIG. 1 is replaced with the autonomous flying body 2b in FIG. 7 as the moving body. The autonomous flying body 2b is a small multicopter such as a drone. Thus, in the following description, the differences from FIG. 1 among the constituent elements shown in FIG. 7 are mainly described.

First, the telematics center 1 includes a 3D-route-candidate generation unit 12b instead of the route-candidate generation unit 12. Unlike vehicles, autonomous flying bodies travel in a three-dimensional space, and it is necessary to generate three-dimensional routes.

Next, since information on the surroundings recognized by the external field sensors 22a is three-dimensional (in the air), it is desirable that a plurality of external field sensors 22a is mounted to recognize the surroundings (front, rear, upper side, lower side, sides, and the like) of the autonomous flying body 2b, or that a plurality of types of external field sensors 22a is mounted to compensate the strengths and weaknesses of each sensor.

There is a further difference as to whether manual operation is performed from the interior of the moving body (inside the vehicle) or from the outside of the moving body (remote control). Thus, the elements for the manual operation of the connected car 2 (the notification unit 24 and the manual operation unit 25) are provided in an external manual controller 2c (a notification unit 24c and a manual operation unit 25c) in the autonomous flying body 2b, and the manual controller 2c is configured so as to communicate with the autonomous flying body 2b via an operation network 9b which is different from the network 9.

With the above configuration, in the case of the autonomous flying body 2b having no driver, it is possible to appropriately switch automatic operation/manual operation according to a traveling environment similarly to the case of the connected car 2.

Figure 8A:
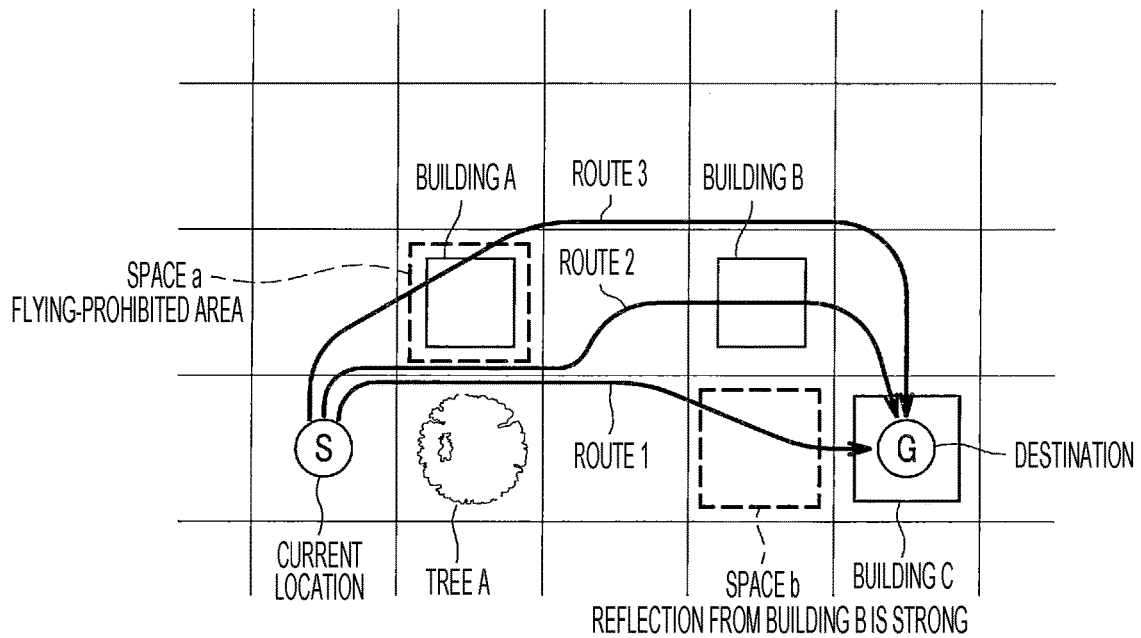
FIG. 8(*a*) is a plan view showing an example of a 3D route on which the autonomous flying body in FIG. 7 flies.

FIG. 8(a) is a plan view showing an example of a 3D route on which the autonomous flying body 2b in FIG. 7 flies.

Figure 8B:
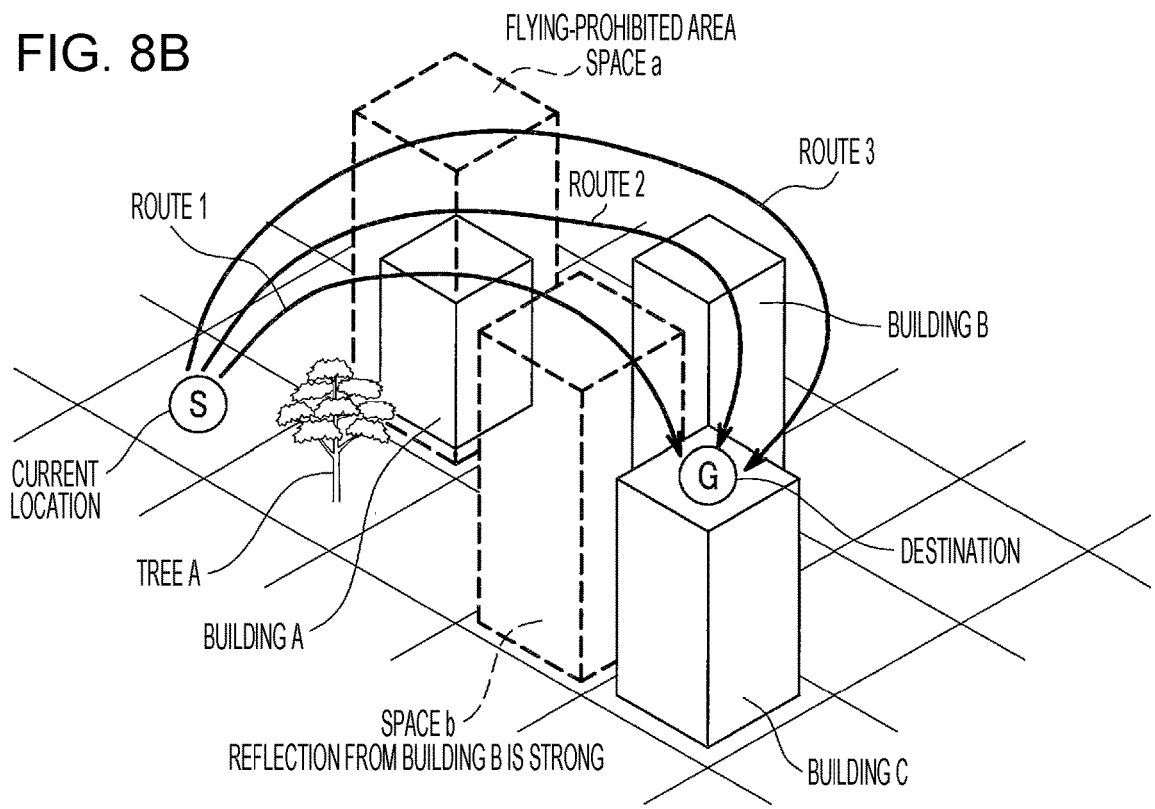

FIG. 8(b) is a three-dimensional view when the 3D route in FIG. 8(a) is viewed from a bird's-eye viewpoint. This three-dimensional diagram simply shows a three-dimensional space, and the three-dimensional space includes buildings A, B, and C, and a tree, and is managed by being divided into grids.

It is assumed that the 3D-route-candidate generation unit 12b generates three route candidates from the route "1" to the route "3". The 3D-route-candidate generation unit 12b adopts the route "2" as described below.

The route "3" passes through the flying-prohibited area set around the building A, and is excluded from the candidates.

The route "1" passes through the space B, in which the reflection from the building B is strong and the sensor evaluation value of the external field sensor 22a which has a weakness to backlight and the like is to be low, and is excluded from the candidates.

In the present embodiment described above, the telematics center 1 that manages, with the external-field recognition DB 11, the history data in which external environments around the moving object is associated with the recognition result (success or failure) of each external field sensor 22a in each external environment, provides a moving body such as the connected car 2 or the autonomous flying body 2b with history data that matches or is similar to the current external environment.

For this reason, it is possible for the moving body to appropriately perform automatic operation control reflecting the history data of the external-field recognition DB 11.

For example, it is possible for the connected car 2 to stably perform automatic operation avoiding erroneous recognition of a camera by not reflecting the recognition result of the camera in the automatic operation at a tunnel exit where the past sensor evaluation value of the camera is low but performing the configuration changing processing of the configuration change unit 22c so as to determine whether there is a front obstacle only from the recognition result of the infrared ray.

Furthermore, in the traveling environment inside the winding tunnel in which the sensor evaluation value of the camera is low and the sensor evaluation value of the infrared ray is also low, the connected car 2 turns off the automatic operation because the section evaluation value of the section are low, and turns on the manual operation unit 25.

Moreover, it is possible for the connected car 2 to reduce the frequency of manual operation by not originally adopting a route candidate having the route evaluation value that is low such as a route passing many sections having low section evaluation values.

Furthermore, the present invention is not limited to the above embodiment and includes various modifications. For example, the above embodiment has been described in detail in order for the present invention to be easily understood, and is not necessarily limited to those having all the described configurations.

Furthermore, a part of the configuration of an embodiment can be replaced with the configuration of another embodiment, and the configuration of an embodiment can be added to the configuration of another embodiment.

Moreover, other configurations can be added, deleted, or replaced with respect to a part of the configuration of each embodiment. In addition, the above configurations, functions, processing units, processing means, and the like may be implemented by hardware by, for example, designing a part or all of them in an integrated circuit.

Alternatively, the above configurations, functions, and the like may be implemented by software by interpreting and executing programs for implementing each function by a processor.

Information such as programs, tables, and files that implement the functions can be stored in a recording device such as a hard disk, or a solid state drive (SSD), or a recording medium such as an integrated circuit (IC) card, an SD card, or a digital versatile disc (DVD).

Note that, control lines and information lines considered to be necessary for the description are shown, and all control lines and information lines are necessarily shown on products. In practice, it can be considered that almost all the configurations are mutually connected.

Furthermore, the communication means for connecting the respective devices is not limited to the wireless LAN, and may be changed to a wired LAN or other communication means.

REFERENCE SIGNS LIST 1 telematics center (center device)
2 connected car (moving body)
2b autonomous flying body (moving body)
2c manual controller
9 network
9b operation network
11 external-field recognition DB (database)
12 route-candidate generation unit
12b 3d-route-candidate generation unit
13 external-field-sensor evaluation unit
14 route evaluation unit
21 automatic-operation planning unit
22 external-field recognition unit
22a external field sensor
22b mode switching unit
22c configuration change unit
23 automatic operation unit
24 notification unit
24c notification unit
25 manual operation unit
25c manual operation unit

The invention claimed is:

1. An automatic operation assistance system comprising:
a center device configured to manage a database that associates a traffic environment in a moving route of a moving body with sensor evaluation values, each sensor evaluation value indicating recognition accuracy of a respective one of external field sensors that recognize the corresponding traffic environment, the center device configured to provide a notification to the moving body in accordance with a request that originated from the moving body, the notification pertaining to the traffic environment of the moving body from which the request originated and the sensor evaluation values matching the external field sensors; and
the moving body being configured to change, on the basis of the sensor evaluation values notified from the center device, a process for reflecting recognition data of the external field sensors of the moving body in automatic operation control of the moving body,
wherein
the center device is configured to calculate section evaluation values obtained by integrating the sensor evaluation values of the external field sensors of the moving body for respective route sections included in the moving route,
the moving body, based on the section evaluation values received from the center device, is configured to turn off automatic operation and urge a driver to perform manual operation in a route section having the section evaluation value lower than a predetermined value,
the center device is configured to calculate route evaluation values for respective moving route candidates, each route evaluation value being obtained by integrating the section evaluation values of the route sections of the moving route,
the moving body is configured to adopt, as a route for the moving body to be moving on, a moving route candidate having the route evaluation value that is highest based on the route evaluation values received from the center device,
the moving body is configured to change a contribution degree of each external field sensor for automatic operation based on a sensor evaluation value of each external field sensor, and
the center device is configured to evaluate each external field sensor based on a number of false detections and a number of non-detections in a same environment, and based on a number of occurrences of false detection and non-detection.

2. The automatic operation assistance system according to claim 1, wherein
the moving body is configured to change a configuration so as not to use, for automatic operation, recognition data of the external field sensors having the sensor evaluation values lower than a predetermined value as the process for reflecting the recognition data of the external field sensors in the automatic operation control of the moving body.

3. The automatic operation assistance system according to claim 1, wherein
the moving body is configured to switch operation modes of the external field sensors having the sensor evaluation values lower than a predetermined value so as to raise the sensor evaluation values as the process for reflecting the recognition data of the external field sensors in the automatic operation control of the moving body.

4. An automatic operation assistance method in an automatic operation assistance system configured so as to connect a center device with a moving body via a network, the method comprising:
managing, by the center device, a database that associates a traffic environment in a moving route of a moving body with sensor evaluation values, each sensor evaluation value indicating recognition accuracy of a respective one of external field sensors that recognize the corresponding traffic environment, the center device giving a notification to the moving body in accordance with a request that originated from the moving body, the notification pertaining to the traffic environment of the moving body from which the request originated and the sensor evaluation values matching the external field sensors; and
changing, by the moving body, a process for reflecting recognition data of the external field sensors of the moving body in automatic operation control of the moving body on the basis of the sensor evaluation values notified from the center device,
the center device calculates section evaluation values obtained by integrating the sensor evaluation values of the external field sensors of the moving body for respective route sections included in the moving route,
the moving body, based on the section evaluation values received from the center device, turns off automatic operation and urges a driver to perform manual operation in a route section having the section evaluation value lower than a predetermined value,
the center device calculates route evaluation values for respective moving route candidates, each route evaluation value being obtained by integrating the section evaluation values of the route sections of the moving route,
the moving body adopts, as a route for the moving body to be moving on, a moving route candidate having the route evaluation value that is highest based on the route evaluation values received from the center device, the moving body changes a contribution degree of each external field sensor for automatic operation based on a sensor evaluation value of each external field sensor, and the center device evaluating each external field sensor based on a number of false detections and a number of non-detections in a same environment, and based on a number of occurrences of false detection and non-detection.

5. The automatic operation assistance method according to claim 4, wherein the moving body changes a configuration so as not to use, for automatic operation, recognition data of the external field sensors having the sensor evaluation values lower than a predetermined value as the process for reflecting the recognition data of the external field sensors in the automatic operation control of the moving body.

6. The automatic operation assistance method according to claim 4, wherein the moving body switches operation modes of the external field sensors having the sensor evaluation values lower than a predetermined value so as to raise the sensor evaluation values as the process for reflecting the recognition data of the external field sensors in the automatic operation control of the moving body.

* * * * *